United States Patent [19]

Kuhn et al.

[11] Patent Number: 4,464,677

[45] Date of Patent: Aug. 7, 1984

[54] METHOD AND CIRCUIT ARRANGEMENT FOR PARTIAL RECORRECTION OF COLOR RECOGNITION SPACES IN COLOR RECOGNITION

[75] Inventors: Franz Kuhn, Schonkirchen; Wilfried Lippek, Kiel, both of Fed. Rep. of Germany

[73] Assignee: Dr. -Ing. Rudolf Hell GmbH, Fed. Rep. of Germany

[21] Appl. No.: 302,475

[22] PCT Filed: Jan. 24, 1981

[86] PCT No.: PCT/DE81/00027

§ 371 Date: Sep. 9, 1981

§ 102(e) Date: Sep. 9, 1981

[87] PCT Pub. No.: WO81/02205

PCT Pub. Date: Aug. 6, 1981

[30] Foreign Application Priority Data

Feb. 1, 1980 [DE] Fed. Rep. of Germany ....... 3003607

[51] Int. Cl.³ .............................................. H04N 1/46
[52] U.S. Cl. ........................................ 358/75; 358/78; 358/80
[58] Field of Search ............................. 358/75, 78, 80

[56] References Cited

U.S. PATENT DOCUMENTS 3,752,590  8/1973  Frappe .
3,878,384  4/1975  Bowker .
4,110,826  8/1978  Mollgaard et al. .
4,204,223  5/1980  Gast ....................................... 358/80
4,328,515  5/1982  Wellendorf .......................... 358/80

Primary Examiner—Michael A. Masinick
Attorney, Agent, or Firm—Hill, Van Santen, Steadman & Simpson

[57] ABSTRACT

The invention relates to a method and to a circuit arrangement for the partial recorrection of color recognition spaces in color recognition. Before the color recognition, the color coordinates (color locations) of characteristic sample points are determined in the colors to be recognized and sample color numbers are allocated to them, said sample color numbers being deposited in a color recognition memory. All color numbers of the remaining color locations of the color space are determined from the sample color numbers and are likewise stored. The respective color locations or, respectively, memory locations occupied with the same color numbers form a color recognition space within the color space. For subsequent boundary correction of a color recognition space, at least one auxiliary color sample is taken from a color to be recognized in the area of the desired change and the necessary sample color number is allocated to it. The color numbers within a spatial cancel area around the color location of the auxiliary color sample are cancelled and, upon incorporation of all sample color locations and sample color numbers, new color numbers are instead calculated and stored for the cancel area.

35 Claims, 6 Drawing Figures

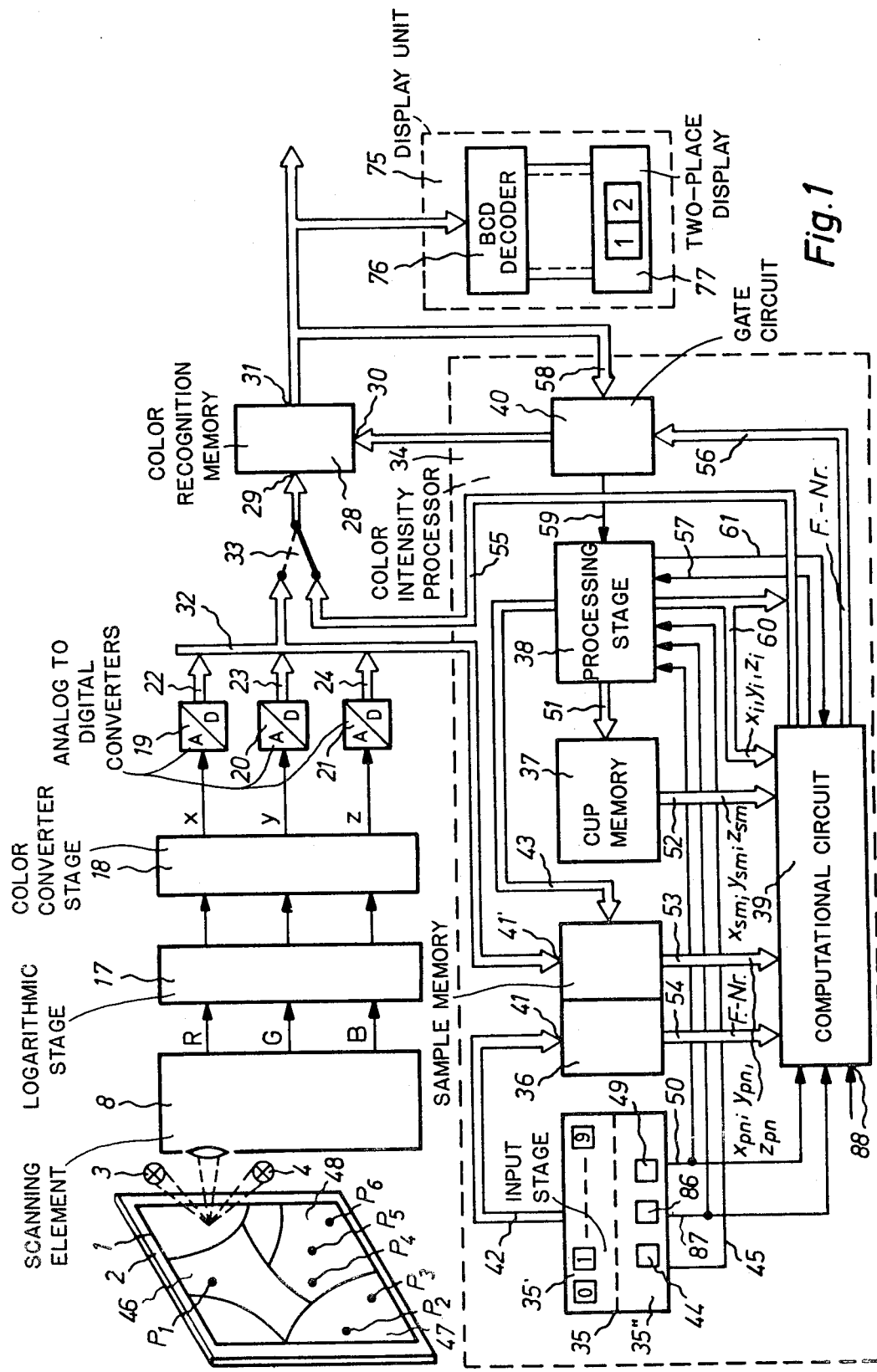

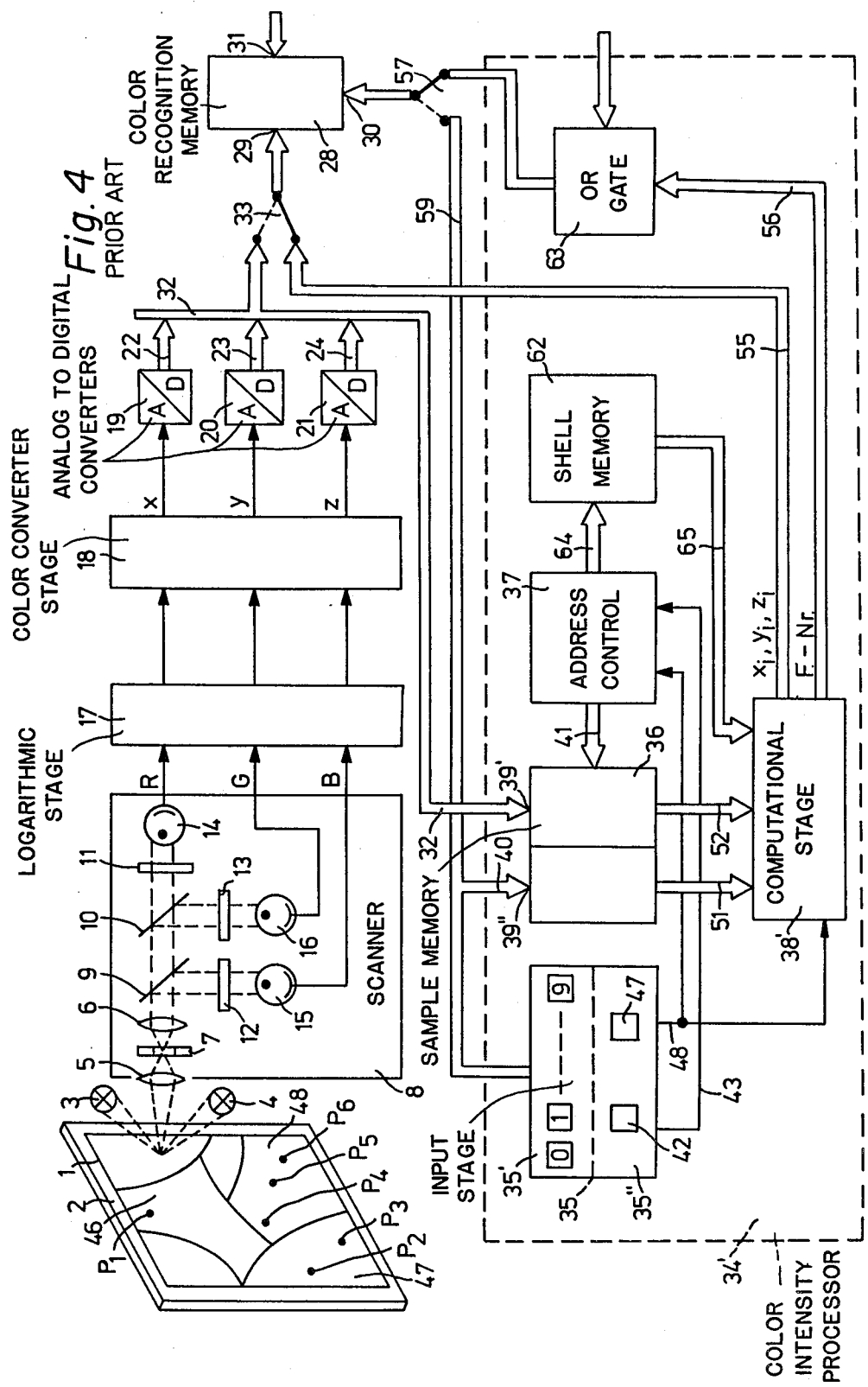

METHOD AND CIRCUIT ARRANGEMENT FOR PARTIAL RECORRECTION OF COLOR RECOGNITION SPACES IN COLOR RECOGNITION

BACKGROUND OF THE INVENTION

1. Field of the Invention

The invention relates to technical fields in which colors must be recognized, particularly relating to color recognition in electronic reproduction technology.

2. Description of the Prior Art

Method for recognizing colors are known from the German Patents (patent application Nos. P 29 23 473.9, P 29 23 468.2 or P 29 23 477.3) in which, before the actual color recognition, the color components of at least one characteristic sample point are opto-electrically determined in each color to be discriminated, whereby the color components represent the spatial coordinates of the respective color locations in the three-dimensional color space. Color numbers are allocated to the color component triads of the measured sample points and the color numbers are deposited under those addresses of a color recognition memory which coincide with the appertaining color component triads. In the color recognition memory, each memory location corresponds to a color location of the color space.

Subsequently, the still-missing color numbers of the remaining color locations are automatically determined from the color numbers of the sample color locations and are likewise deposited under the corresponding addresses of the color recognition memory. All color locations occupied with the same color number respectively form a bounded color recognition space of one color or of a spatial color region within the color space.

During the actual color recognition, the colored surfaces to be analyzed are opto-electrically scanned point and linewise and the color components thereby gained call in the corresponding addresses of the color recognition memory. The color numbers deposited there are read out, whereby the association of the scanned colors to the bounded color recognition spaces is determined.

The size, shape and position of a color recognition space in the color space determine the spatial color region which is evaluated in the color recognition as belonging to one color. For the purpose of a precise color determination, therefore, it is necessary that the boundaries of the individual color recognition spaces be matched as well as possible to the color regions to be separated. In the known method, this demand is met by a sufficiently large plurality of targeted color samples taken per color region. Nonetheless, in practice, it occasionally turns out only after the color recognition, for example, on the basis of a color separation, that, for the purpose of an even better color separation, the limitation of one or more color recognition spaces must be partially changed or that the color space must be subdivided into even finer color recognition spaces. In this case, given the known method, new color samples must be taken, the color numbers must be recalculated, and the color recognition memory must again be filled. These measures, however, mean a longer preparation time for the actual color recognition.

Refer to FIG. 6 which shows the Prior Art.

The image to be analyzed may be an image or pattern for multiple color printing, or for textile printing, decorative printing or package printing, or also a design pattern for obtaining control data for textile processing machines. The colored image may include a color printing medium and generally any colored surface or plane.

The colored image will generally include separate, adjoining colors, and colors vignetting into one another. The individual colors may, for example, due to color tolerances or due to an irregular application of the color, show color deviations. During color recognition, the problem arises to separate the individual colors from one another, or, if necessary, to combine color deviations in the colored image into a single color. In colors vignetting into one another, namely in colors showing gradual saturation and/or brightness changes, such color deviations have been intended by the designer. The color recognition process must cope with the problem to either separate the colors vignetting into one another, or, if necessary, to combine some colors vignetting into one another into a single color.

The colored image 1, which is mounted on a carrier 2, is illuminated by two light sources 3 and 4 of known spectral composition, and the reflected or transmitted scanned light passes via lenses 5 and 6, and via a light stop 7 to a scanner 8. In the scanner 8, the scanned light is split by means of two dichroitic color separators 9 and 10 into three partial beams, which pass through color correction filters 11, 12 and 13 and impinge on three photoelectric transducers 14, 15 and 16 respectively. The transducers 14, 15 and 16 transform each partial light beam according to the intensities of the color components of the scanned colors into trichromatic color-measuring signals red, green and blue, which represent the spatial coordinates of the associated color locations in the cartesian red, green and blue color space.

Each trichromatic color-measuring signal red, green and blue passes through a logarithmic stage 17, where it is amplitude or gamma-corrected and/or modified according to a predetermined gradation curve.

In a color converter stage 18, the trichromatic color-measuring signals red, green and blue are transformed by an appropriate matrix into chrominance signals x and y, and into a luminance signal z according to the relations:

$$x = a_{11}R + a_{12}G + a_{13}B$$

$$y = a_{21}R + a_{22}G + a_{23}B$$

$$z = a_{31}R + a_{32}G + a_{33}B$$

This matrix transformation corresponds to a transformation of the red, green and blue color space into a chrominance-luminance color space. The chrominance signals x and y represent the color coordinated of the color locations in the chrominance plane, and the luminance signal z represents the third coordinate or grey axis. Transformations of this type are known in color television.

The chrominance signals x and y, and the luminance signal z are converted in analog-to-digital transducers 19, 20 and 21 into digital signals, each signal having a word length of five bits each, which signals pass to outputs 22, 23 and 24 respectively. Digitizing of these signals may be accomplished with different respective quantizations.

The outputs 22, 23 and 24 of the analog-to-digital transducers 19, 20 and 21 are fed to an address bus 32, which is connected to an address input 29 of a color recognition memory 28 through a switch 33. Said color recognition memory 28 has a plurality of storage locations representing the individual color locations of the color space. Each storage location is addressable by these digital signals x, y and z, which represent the color coordinates of the respective color location. Identification symbols for the colors to be recognized in the form of color numbers are stored in the individual storage locations of the color recognition memory 28.

During the actual color recognition process, the scanner 8 then scans the colored image 1 point by point, and line by line, by a relative movement between the scanner 8 and the image carrier 2. The color coordinates, or equivalent addresses obtained thereby, then call up, via the address bus 32 and the switch 33, the corresponding color numbers in the color recognition memory 28, which are then read out via the data output 31 from the color recognition memory 28, whereby the colors are identified. The switch 33 is then positioned in the position shown dotted.

Preparatory to color recognition the individual color recognition spaces for the colors to be identified must be separated within the color space by assigning respective color numbers to the color locations of the color space or respectively to the storage locations of the color recognition memory 28. The filling process is accomplished by the following method steps:

(a) selecting in said colors of said image a number of sample points, each sample point having a sample point color and measuring the color coordinates of the sample color locations of said selected sample point colors;

(b) defining an identification symbol or color number for each selected sample point color to be recognized and assigning the defined color numbers to the sample color locations around which color recognition spaces are to be built; and (c) building up the individual color recognition spaces by filling the color recognition memory with respective color numbers in the steps of: surrounding the sample color locations with selected color locations so as to form shells of successively increasing size around the sample color locations, calling-up said selected color locations shell by shell at successively increasing distances from the sample color locations, checking each called-up color location to determine whether a color number has already been alloted thereto, and assigning the color number alloted to a corresponding sample color location to said called-up color location if no color number has already been alloted to said called-up color location. After said color recognition memory 28 has been filled up in the described way all color locations bearing the same color number forming a color recognition space for the selected sample point color defined by said color number.

That method steps are carried out with the aid of the scanning member 8 and a color processor 34'.

The color processor 34' includes an input stage 35, a sample point memory 36, an address control stage 37, a calculating or processing stage 38' and a shell memory 62. The input stage 35 includes a first operator area 35', on which there are disposed ten keys for the selection of the color number, and a second operator area 35", which includes a plurality of operating keys.

The operation of the color processor 34' will now be explained further below.

Determination of sample points and sample point colors (Method steps a) and b))

In a first step, at least one sample point color is obtained for each color to be recognized from the colored image 1, and each sample point color is assigned a color number. The scanner 8 then scans characteristic test points $P_n$ of the individual colors yielding measured color signals red, green and blue. The sample point color coordinates $x_{pn}$, $y_{pn}$ and $z_{pn}$ obtained in this way are then fed via the address bus 32 to the data input 39' of the sample point memory 36. At the same time, the operator obtains a roster of sample points or sample point colors, by associating through the input stage 35 each trichromatic set of sample point color coordinates $x_{pn}$, $y_{pn}$ and $z_{pn}$ (fifteen bits) with a color number "N" (four bits), which roster of sample points or sample point colors are fed via the data bus 40 to the date input 39" of the sample point memory 36. Each line of the roster of sample points or sample point colors, is stored in the sample point memory 36 in terms of nineteen bit words under respective addresses, which are called up by the address control stage 37 via the address input 41 of the sample point memory 36. For this purpose, the operator actuates between the individual sample point extractions an operating key 42 denoted "Test" in the operating area 35" of the input stage 35, which has the effect that a corresponding order on a lead 43 increases the addresses in the address control stage 37 by one each.

The number of sample point colors to be obtained depends substantially on the type of the colors to be recognized, on the color image, and on the required precision or accuracy, in separating colors.

An example for obtaining a roster of sample points or sample point colors is given below.

Assume that a color to be recognized as "blue" on a surface 44 of the color image 1 has a uniform saturation and brightness. In this case, it is adequate, to extract only one sample point color in a sample point $P_1$, and to assign, for example, the sample point color coordinates $x_{p1}$, $y_{p1}$ and $z_{p1}$ of the recognition color "blue", the color number "1".

A second color to be recognized on a surface 45 of the colored image 1 may actually consist of two or more colors, for example, it may show color regions or area colors "light red" and "dark red", which are combined into a single color "red" to be recognized.

In such a case, the sample point $P_2$ in the corresponding color region or area color is measured as "light red", but the sample point color coordinates $x_{p2}$, $y_{p2}$ and $z_{p2}$ are assigned a color number "2" of the color "red" to be recognized.

Subsequently, a sample point color is extracted from the color region or area color "dark red" by means of the sample point $P_3$, and the sample point color coordinates $x_{p3}$, $y_{p3}$ and $z_{p3}$ are also assigned the color number "2" of the color "red" to be recognized.

A third color in another surface 46 of the colored image 1 may also consist of two or more colors, and may, for example, include the color regions "light yellow", "medium yellow" and "dark yellow" which are to be separated from one another. In such a case, at least one sample point color is extracted from each color region or area color (sample points $P_4$, $P_5$ and $P_6$) and the associated sample color coordinates $x_{p4}$, $y_{p4}$ and $z_{p4}$ are assigned a color number "3" of the color "light yellow" to be recognized, the sample point color coordinates $x_{p5}$, $y_{p5}$ and $z_{p5}$ are assigned a color number "4" of the color "medium yellow" to be recognized, and finally the sample point color coordinates $x_{p6}$, $y_{p6}$ and $z_{p6}$ are assigned the color number "5" of the color "dark yellow" to be recognized.

Upon the extraction of a sample point color from the $n^{th}$ test point and the assignment of a color number "N", the following list of sample points or sample point colors has now been ascertained and stored:

| Sample Point | Address | Storage Values | |
|---|---|---|---|
| | | Color No. | Sample point color coordinates |
| $P_1$ | 1 | 1 | $x_{p1}$, $y_{p1}$, $z_{p1}$ |
| $P_2$ | 2 | 2 | $x_{p2}$, $y_{p2}$, $z_{p2}$ |
| $P_3$ | 3 | 2 | $x_{p3}$, $y_{p3}$, $z_{p3}$ |
| $P_4$ | 4 | 3 | $x_{p4}$, $y_{p4}$, $z_{p4}$ |
| $P_5$ | 5 | 4 | $x_{p5}$, $y_{p5}$, $z_{p5}$ |
| $P_6$ | 6 | 5 | $x_{p6}$, $y_{p6}$, $z_{p6}$ |
| . | . | . | . |
| . | . | . | . |
| . | . | . | . |
| $P_n$ | n | N | $x_{pn}$, $y_{pn}$, $z_{pn}$ |

Filling of the Color Recognition Memory (Method step c))

Following extraction of the sample points, color numbers have already been assigned to those color locations to which a sample point number corresponds (sample color locations). Starting with the sample color locations the color recognition spaces are built up from the individual sample color locations, the associated color numbers are obtained, and the so obtained color numbers are stored in the color recognition memory 28.

The color recognition spaces are extended within the chrominance-luminance color space, so as to assume substantially the shape of a cube or a sphere, by surrounding the individual sample color locations with spherical shells or shells shaped in the form of a cube at successively increasing distances. The color locations used as building blocks for the spherical or cube-shaped shells, are also simultaneously tested whether a color number has been assigned to them during extraction of the sample points. In the case that a color location so examined or tested has not yet been assigned a color number, it will be assigned the color number of its associated central sample color location. If, however, the color location to be examined has already been assigned a color number, the expansion of the color recognition spaces at this point is interrupted. In the example discussed, spherical shells are employed.

These processes will be explained in detail as follows:

Construction of Spherical Shells

The color locations forming the individual spherical shells laid around the sample color locations are approximated by corresponding color locations. The spatial vectors $F_{sm}$ of the color locations or their shell coordinates $x_{sm}$, $y_{sm}$ and $z_{sm}$, referred to an auxiliary coordinate system having as an origin the corresponding sample color location participating in the formation of the spherical shells, have already been determined prior to the color recognition proper, and have been stored in the shell memory 62 shell by shell in the form of a list of successive shells.

The shell coordinates $x_{sm}$, $y_{sm}$ and $z_{sm}$ satisfy the general spherical equation:

$$r_m = \sqrt{x_{sm}^2 + y_{sm}^2 + z_{sm}^2} \qquad (2)$$

having a radius $r_1 = \sqrt{1}$ for the first shell, a radius $r_2 = \sqrt{2}$ for the second spherical shell, a radius $r_3 = \sqrt{3}$ for the third spherical shell, and in general, having a radius $r_m = \sqrt{m}$ for the $m^{th}$ spherical shell.

The sum total of all trichromatic integers, which satisfy this spherical equation having a predetermined radius $r_m$, namely whose quadratic sum is equal to $r_m^2$, form the shell coordinates $x_{sm}$, $y_{sm}$ and $z_{sm}$ of the color locations associated with the $m^{th}$ spherical shell. Starting with at least one representative, an ordered shell coordinate triple value for the $n^{th}$ spherical shell, all remaining shell coordinates $x_{sm}$, $y_{sm}$ and $z_{sm}$, are obtained by permutation and sign reversal.

The obtaining of shell coordinates with the aid of digital counters is accomplished, for example, as follows:

Zeroth Sphere ($r_0 = 0$)

This shell corresponds to a sample color location having sample point color coordinates $x_{pn}$, $y_{pn}$ and $z_{pn}$. The shell coordinates are equal to 0.

First Sphere ($r_1 = \sqrt{1}$)

Representative triple value of shell coordinates: (0,0,1).

Shell coordinates: (0,0,1); (0,1,0); (1,0,0); (−1,0,0); (0,−1,0); (0,0,−1).

Second Spherical Shell ($r_2 = \sqrt{2}$)

Representative spherical triple value of shell coordinates: (0,1,1).

Shell coordinates: (0,1,1); (1,0,1); (1,1,0); (0,1,−1) etc.

Third Spherical Shell ($r_3 = \sqrt{3}$)

Representative spherical shell coordinate triple value: (1,1,1).

In an analogous way, appropriate shell coordinates result therefrom.

Obtaining of the Color Coordinates (addresses $x_i, y_i, z_i$)

The color coordinates $x_i$, $y_i$ and $z_i$ of the color location participating in the formation of spherical shells around a sample color location in a chrominance-luminance color space or the corresponding storage locations of the color recognition memory 28 are obtained from the shell coordinates $x_{sm}$, $y_{sm}$ and $z_{sm}$, and the sample point color coordinates $x_{pn}$, $y_{pn}$ and $z_{pn}$ according to the equations:

$$x_i = x_{pn} + x_{sm}$$

$$y_i = y_{pn} + y_{sm}$$

$$z_i = z_{pn} + z_{sm} \qquad (3)$$

The determination of the individual triple value color coordinates is accomplished in succession, by successively surrounding each sample color location by a first spherical shell, subsequently each sample color location by a second spherical shell and so forth.

The storing of color numbers in the storage locations of the color recognition memory 28 is started by actuating the key 47 denoted as "filling memory", as a result of which an appropriate command is fed via a lead 48 to the address control stage 37 and to the calculating or processing stage 38'. This results in all storage locations of the color recognition memory 28 having stored therein color numbers "0".

The address control stage 37 is connected to the sample point memory 36 and to the shell memory 62 via address buses 41 and 64, respectively. The shell coordinates $x_{sm}$, $y_{sm}$ and $z_{sm}$ are transcribed via a data bus 65, the sample point coordinates $x_{pn}$, $y_{pn}$ and $z_{pn}$ via a data bus 52, and the associated color numbers via a data bus 51, to the calculating or processing stage 38'. From the transcribed coordinates, there are ascertained the color coordinates $x_i$, $y_i$ and $z_i$ in the calculating or processing stage 38' according to the equations (3), the color coordinates $x_i$, $y_i$ and $z_i$ calling out the appropriate storage locations of the color recognition memory 28, via the address bus 55, the switch 33 and the address input 29.

First the shell lists of the zeroth spherical shell ($x_s = y_s = z_s = 0$) and the entire roster of sample points is fed line by line into the processing stage 38'. In this case, the so determined color coordinates $x_i$, $y_i$ and $z_i$ are equal to the sample point color coordinates $x_{pn}$, $y_{pn}$ and $z_{pn}$ of the individual sample color location, and in the color recognition memory 28, the color numbers associated with the corresponding sample color locations are stored in the called-up storage locations. These color numbers are fed to the color recognition memory 28 from the processing stage 38' via the data bus 56, the OR-gate 63, the switch 57, and the data input 30.

In the next step, the shell list for the first spherical shell is fed to the processor 38', and the list or roster of sample points is worked over line for line again, the color coordinates $x_i$, $y_i$ and $z_i$ of the first shell being successively determined around each sample color location. These color coordinates again address the color recognition memory 28. Simultaneously, each addressed storage location is tested again as to whether a color number has already been assigned to it. For this purpose, OR-gate 63 is connected to the data output 31 of the color recognition memory 28 via a data lead 66. If a color number has been assigned to the corresponding storage location, the appropriate OR-gate 63 is inhibited, so that it is no longer possible to write in a color number via the data bus 56 to the color recognition memory 28. If, however, the corresponding storage location has not been assigned a color number, the corresponding OR-gate 63 is open, and allows the signal to pass, and the color number of the corresponding sample color location is stored in the respective storage location called up, around which sample color location a spherical shell is just being formed.

Thus, each sample color location is surrounded by an increasing number of spherical shells, until one or several color recognition spaces, or the whole color space has been assigned appropriate color numbers.

SUMMARY OF THE INVENTION

It is therefore the object of the present invention to specify a method for the partial recorrection of color recognition spaces in color recognition, in which, for the purpose of increasing the recognition certainty with a low outlay and in the shortest possible time, subsequent, partial boundary corrections are carried out at the color recognition spaces in order to achieve an even more favorable matching to the color regions to be separated.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

In the following, the invention is described in greater detail on the basis of FIGS. 1 through 3. There are shown:

FIG. 1 a circuit arrangement for the implementation of the method;

FIG. 4 illustrates the prior art.

DESCRIPTION OF THE PREFERRED EMBODIMENTS

Figure 2A:
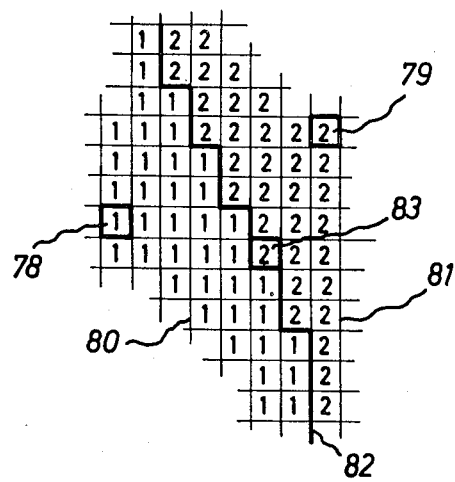
FIGS. 2a, 2b, and 2c are graphic illustrations for explaining the invention.

FIG. 1 shows a circuit arrangement for the implementation of the method which essentially coincides with the circuit arrangement respectively illustrated in FIG. 1 of the above patents, whereby identical components are referenced with the same reference numerals.

Let it be assumed that the color recognition memory 28 is already filled with color numbers. For the purpose of filling, the characteristic sample points $P_1$ through $P_n$ of the color master 1 were successively scanned with the assistance of a scanning element 8 (only schematically illustrated here) and the measured sample color coordinate triads $x_{pn}$, $y_{pn}$ and $z_{pn}$ were loaded via the address bus 32 into the sample memory 36. At the same time, the operator has allocated a color number to each sample color coordinate triad with the assistance of the ten-key keyboard of the operating console 35' in the input stage 35, said color numbers having been stored list-wise via the data bus 42 with the appertaining sample color coordinates. A sample list deposited in this manner in the sample memory 36 is specified in the cited patents. Color numbers are already assigned to all sample color locations by means of the production of the sample lists. Subsequently, the color recognition spaces are automatically formed around the sample color locations in the form of spherical or cubical cups, in that the color locations lying within the cups are called up cup-by-cup with an increasing distance from the color samples and are occupied with color numbers. To that end, the color coordinates $x_i$, $y_i$ and $z_i$ of the color locations belonging to the cups are determined in the computational circuit 39 from the cup coordinates $x_{sm}$, $y_{sm}$ and $z_{sm}$ deposited in the cup memory 37 and from the sample color coordinates $x_{pn}$, $y_{pn}$ and $z_{pn}$ inscribed in the sample memory 36, said color locations belonging to the color coordinates $x_i$, $y_i$ and $z_i$ calling up the corresponding addresses in the color recognition memory 28 via the address bus 55. Each memory location (color location) called up is occupied with the color number of the appertaining sample color location. Subsequently, the filling of the color recognition memory 28 is terminated.

In order to supervise the color recognition spaces which have been formed in view of the later color recognition, a color number display unit 75 follows the color recognition memory 28 in FIG. 1, said color number display unit 75 consisting, for example, of a BCD decimal decoder 76 and of a two-place 7-segment display 77. The BCD decimal decoder 76 converts the 4-bit color numbers read out from the data output 31 of the color recognition memory 28 into corresponding control signals for the 7-segment display 77, so that the color numbers "0" through "15" can be displayed there.

In the supervision of the memory filling, the operator approaches characteristic color points within the color master 1 with the scanning element 8. After being digitized in the analog-to-digital converters 19, 20 and 21, the measured color components of these color points address the color recognition memory 28 via the address bus 32 and the changeover switch 33. The color numbers deposited under the called-up addresses are read out via the data output 31 and are displayed at the color number display unit 75.

With this work method, one can check to see whether the proper color number or, respectively, the proper color recognition space has been allotted to a specific color or to a spatial color region of the color master 1. This inspection is of particular importance for such colors whose color locations lie close to the boundary surfaces of the color recognition spaces. If, in the examination of such a color location, namely, it turns out that the color number of the adjacent color recognition space would have more properly been assigned to it, the color number of the appertaining color location is partially corrected according to the invention in the desired manner while taking the color space environment into consideration without a re-filling of the entire color recognition memory 28 being necessary.

Such corrections are necessary in practice, for example, when, before the memory filling, too low a number or false color samples had been taken from the color master 1. On the other hand, partial boundary correction offers the possibility of first proceeding from a lower number of color samples in the formation of the color recognition spaces, i.e., of proceeding from a rougher color sampling and of then simply optimizing the matching of the color recognition spaces to the color regions to be separated in the necessary sections. This method advantageously shortens the preparation time for the actual, automatic color recognition. Boundary corrections of the specified type can also be advantageously carried out in order to eliminate contours in color separations or for the purpose of a finer subdivision of the color recognition spaces.

The inventive method for partial correction of color recognition spaces consists of three steps, namely, of taking additional color samples in the color master 1, of the partial cancellation of the color numbers around the additional sample color locations in the color recognition memory 28 and of re-filling the cancelled regions with color numbers.

Figure 2B:
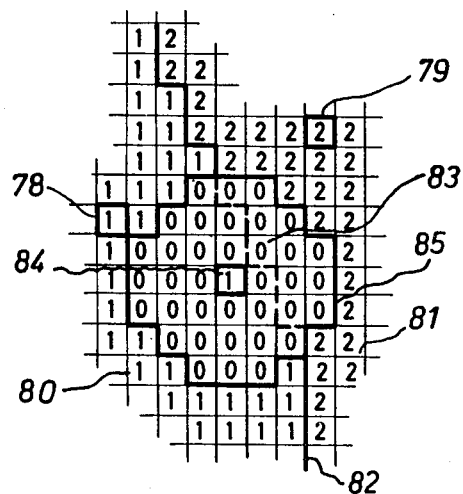
Figure 2C:
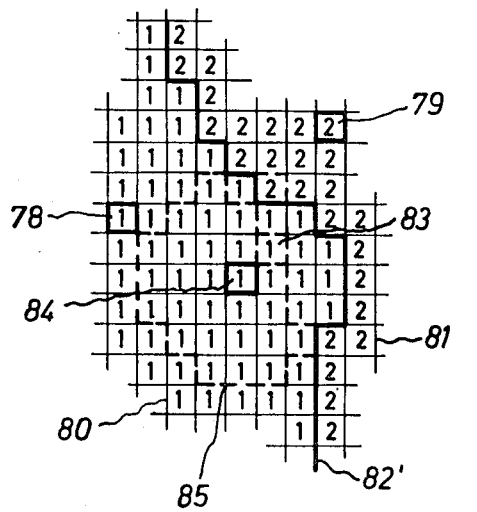

The individual steps are to be explained on the basis of the graphic illustrations in FIGS. 2a through 2c and on the basis of the circuit arrangement according to FIG. 1.

The memory filling before the partial correction is illustrated in FIG. 2a, in which, by way of an excerpt, the color locations (occupied with color numbers) of a chrominance plane (z=constant) of the chrominance-/luminance color space are illustrated or, respectively, the corresponding memory level of the color recognition memory 28 is illustrated.

In taking color samples for the initial filling of the color recognition memory 28, referred to as principal color samples below, the principal sample color locations 78 and 79 had the color numbers "1" and "2" assigned to them. A first color recognition space 80 (color locations with the color number "1") has formed around the principal sample color location 78 and a second color recognition space 81 (color locations with the color number "2") has formed around the principal sample color location 79, being separated from one another by a boundary line 82.

For example, in the check of the memory filling for a color measured in the color master 1, the color number display unit 75 now registers the color number "2". In the illustrated chrominance plane of FIG. 2a, let this color correspond to the color location 83. It can now be desirable that the measured color and its spatial environment not be allocated to the color recognition space 81, but, rather, be allocated to the color recognition space 80 with the color number "1". According to the invention, the boundary line 82 in the area of the color location 83 is shifted in the direction of the principal sample color location 79 in this case.

1. Taking Auxiliary Color Samples

For the sake of clarity, only one auxiliary color sample is taken from the color master 1 in the example under consideration. The plurality of auxiliary color samples is random and is essentially dependent upon the required corrections. In FIG. 2b, let the auxiliary color sample taken correspond to the auxiliary sample color location 84 which is again occupied with the color number "1" here. Thus, it retains the same color number which was determined for it in the initial filling of the color recognition memory 28. The difference is that the appertaining color location is now an auxiliary sample color location, proceeding from which the color space environment is influenced upon consideration of all sample color locations, i.e., of all principal sample and auxiliary sample color locations. For the sake of simplification, sample color locations shall be mentioned below when the totality of the all principal sample and auxiliary sample color locations is meant. In terms of position, the auxiliary sample color locations need not coincide with the color locations to be corrected, but, rather, need only lie in the spatial proximity of the required boundary correction. Of course, random color numbers can be assigned to the auxiliary sample color locations.

The taking of auxiliary color samples is executed in the circuit arrangement according to FIG. 1 as follows:

With the scanning element 8, the operator measures one or more characteristic auxiliary color samples in the color master 1 and the appertaining color components $x_{zp}$, $y_{zp}$ and $z_{zp}$ (15 bits) digitized in the analog-to-digital converters 19, 20 and 21 arrive via the address bus 32 to the data input 41' of the sample memory 36. At the same time, the operator produces a list of auxiliary samples in that, by means of the ten-key keyboard of the operating console 35', he allocates a color number "N" (4 bits) to each color coordinate triad in the input stage 35, said color number "N" being forwarded via the data bus 42 to the data input 41" of the sample memory 36.

Each line of the list of auxiliary samples is deposited in the sample memory 36 as a 19-bit memory word under continuous addresses which are called up by the address control unit 38 via the address bus 43. To that end, the operator actuates the operating key 44 "sample" in the operating console 35" of the input stage 35 between the individual sample takings, whereby a corresponding command on a line 45 to the address control unit 38 respectively increases the memory address by "1". The list of auxiliary samples produced in this manner can be deposited in the sample memory 36 as an independent list or as an appendix to the original principal sample list given appropriate marking.

2. Cancellation of the Color Numbers Around the Auxiliary Sample Color Locations After the auxiliary color samples have been taken from the color master 1, the originally determined color numbers around the corresponding auxiliary sample color locations must be cancelled, an operation which is likewise illustrated in FIG. 2b for the auxiliary sample color location 84. To that end, a cancel area 85 is defined around the auxiliary sample color location 84 and all color locations lying within the cancel area 85 are occupied with the color number "0".

The original boundary line 82 between the color recognition spaces 80 and 81 is shown with broken lines in FIG. 2b within the cancel area 85. The extent of the cancel areas determines the corrective influence of the auxiliary color samples on the previously formed color recognition spaces. The extent of the cancel areas can be fixed according to various criteria which shall be discussed later. The cancel areas can be spherical or cuboid, but can also assume any other three-dimensional shape.

The cancellation of the color numbers in the color recognition memory 28 of the circuit arrangement according to FIG. 1 sequences as follows:

The cancel operation is initiated by means of actuating a key 86 "cancel" in the operating console 35" of the input stage 35, whereby a cancel command is forwarded via the line 87 to the address control unit 38 and the computational circuit 39.

It is assumed in the sample embodiment according to FIG. 2b that the cancel areas are spherical. The color coordinates $x_i$, $y_i$ and $z_i$ of the color locations lying within the spherical cancel areas or, respectively, the memory addresses can be called up cup or line-wise and be occupied with the color numbers "0".

2.1 Cup-Wise Cancellation of the Color Numbers

In this case, spherical cups are formed around the individual auxiliary sample color locations in that the corresponding memory addresses are called up cup-by-cup with increasing spacing until the periphery of the cancel areas is reached. The necessary color components or, respectively, memory addresses $x_i$, $y_i$ and $z_i$ of the color locations participating in the spherical cup formation derive from the cup coordinates $x_{sm}$, $y_{sm}$ and $z_{sm}$ and from the respective color coordinates $x_{zp}$, $y_{zp}$ and $z_{zp}$ of the appertaining auxiliary color sample locations as cup centers according to the equations:

$$x_i = x_{zp} + x_{sm}$$

$$y_i = y_{zp} + y_{sm}$$

$$z_i = z_{zp} + z_{sm} \qquad (1)$$

The cup coordinates are deposited as cup lists in the cup memory 37 and the auxiliary sample color coordinates are deposited as auxiliary sample lists in the sample memory 36. The formation of the cup coordinates is described in detail in the patent . . . (Patent application P No. 29 23 473.9), so that we can forego a detailed explanation here.

In order to interrogate the auxiliary sample list and the cup list, the address control unit 38 is connected via the address busses 43 and 51 to the sample memory 36 and to the cup memory 37. The cup coordinates $x_{sm}$, $y_{sm}$ and $z_{sm}$ are overwritten into the computational circuit 39 via the data bus 52 and the auxiliary sample color coordinates $x_{zp}$, $y_{zp}$ and $z_{zp}$ are overwritten into the computational circuit 39 via the data bus 53 and the color coordinates $x_i$, $y_i$ and $z_i$ required for the cup formation are calculated therefrom according to equations (1).

The cup formation ensues in such manner that, in succession, the first cup is placed around each individual auxiliary sample color location, then the second cup, etc. However, all cups can be placed around one auxiliary sample color location and, subsequently, all cups can be placed around the next auxiliary sample color location, etc. The color coordinates $x_i$, $y_i$ and $z_i$ which arrive at the address input 29 via the address bus 55 and the changeover switch 33 call in the appertaining addresses in the color recognition memory 28 under which the color numbers "0" are deposited via the data bus 56 and via the gate circuit 40.

The cup formation around the auxiliary samples and the occupation with the color numbers "0" is broken off as soon as a cancel area has reached its desired scope. Then, the command "truncate" is forwarded on the line 57 to the address control unit 38 and the calling-up of the cup list and of the auxiliary sample list is stopped.

The extent of a cancel area can be truncated when cancel areas are tangential or when the cancel area radius r has been reached. The operator can make the cancel area radius r equal, for example, for all cancel areas or can be differently prescribed at a programming input 88 of the computational circuit 39.

The cancel area radius r for an auxiliary color sample location, however, can also be automatically determined as a fraction of the spatial distance d between the appertaining auxiliary sample color location and the respective sample color location which lies in the closest spatial proximity and which is occupied with a color number which differs from that of the appertaining auxiliary sample color location. To that end, the color coordinates $x_{zp}$, $y_{zp}$ and $z_{zp}$ of the appertaining auxiliary sample from the auxiliary sample list and, in succession, all color coordinates $x_p$, $y_p$ and $z_p$ of the principal sample and auxiliary sample lists are called in from the sample memory 36 and the distances d are determined in the computational circuit 39 according to the vectorial spacing equation:

$$d = \sqrt{(x_p - x_{zp})^2 + (y_p - y_{zp})^2 + (z_p - z_{zp})^2} \qquad (2)$$

The required cancel area radius r then derives from the smallest spacing $d_{min}$.

The cancel area radius r can also be fixed in an advantageous manner on the basis of the color master 1 to be analyzed. To that end, the operator, with the scanning element 8, determines the color coordinates $x_r$, $y_r$ and $z_r$ of that color in the color master 1 which is not to be changed by a specific auxiliary sample, which, thus, lies at the periphery of the cancel area around this auxiliary sample. The required cancel area radius r is then calculated from the color coordinates $x_r$, $y_r$ and $z_r$ and the auxiliary sample color coordinates $x_{zp}$, $y_{zp}$ and $z_{zp}$ according to the specified vectorial spacing equation (2).

2.2 Line-Wise Cancellation of the Color Numbers

For the formation of a spherical cancel area around an auxiliary sample color location in this case, the color coordinates or, respectively, memory addresses, of all color locations are successively called in line-by-line, the spatial distance d between the currently called-in color location and the auxiliary sample color location is determined, and is compared to the prescribed or calculated cancel area radius r. All called-in color locations (addresses) whose spacing d is smaller than the cancel area radius r lie within the cancel area and, as already explained, are occupied with the color number "0". Subsequently, the operation is repeated for the next auxiliary color sample.

This operation sequences with the circuit arrangement as follows.

The color coordinates $x_{zp}$, $y_{zp}$ and $z_{zp}$ of one of the auxiliary color samples are transferred from the auxiliary sample list deposited in the sample memory 36 into the computational circuit 39. The address control unit 38 calls in all possible color coordinates $x_i$, $y_i$ and $z_i$ which address the color recognition memory 28 via the address bus 55 line-by-line. At the same time, the called-in color coordinates arrive via the data bus 60 into the computational circuit 39 in which the aforementioned spacing calculation is executed.

For that case in which cuboid cancel areas are to be formed, the area boundaries are defined by the values $\Delta x$, $\Delta y$ and $\Delta z$ around the auxiliary color samples. The address control unit 38 again calls the addresses of the color recognition memory 28 in line-by-line. When the called-in addresses fall within the appertaining cancel area, these are occupied with the color numbers "0".

3. Re-filling the Cancel Areas with Color Numbers

After the cancel areas have been formed around the auxiliary sample color locations, new color numbers are automatically determined for the color locations lying within the cancel areas, in that that color number is allocated to each of the color locations to be occupied which is allocated to the sample color location which lies in the closest spatial proximity.

FIG. 2c shows the chrominance plane after the re-filling of the cancel area 85 around the auxiliary sample color location 84. The color recognition space 80 with the color number "1" has spread into the color recognition space 81 with the color number "2", whereby the new boundary line 82' has been formed. The old boundary line 82 and the former cancel area 85 are again indicated with broken lines. The corrected color location 83, including its color space environment, is now clearly allocated, as desired, to the color recognition space 80 with the color number "1".

The re-filling sequences in the circuit arrangement of FIG. 1 as follows:

First, all auxiliary sample color locations or, respectively, their memory addresses are occupied by the color numbers previously allocated by the operator. To that end, with the assistance of the address control unit 38, all color numbers and auxiliary sample color coordinates of the auxiliary sample list are transferred out of the sample memory 36 via the data buses 53 and 52 into the computational circuit 39. The auxiliary sample color coordinates $x_{zp}$, $y_{zp}$ and $z_{zp}$ address the color recognition memory 28 via the address bus 55 and the corresponding color numbers of the auxiliary color samples are transferred to the color recognition memory 28 via the data bus 56, the gate circuit 40 and via the data input 30. The cup or line-wise re-filling of the cancel areas ensues subsequently.

3.1 Cup-Wise Re-filling of the Cancel Areas 3.1.1 In a first method form, all color locations or, respectively, memory addresses which surround the sample color locations, i.e., the principal sample and auxiliary sample color locations cup-wise are successively called in cup-by-cup with increasing spacing from the appertaining sample color locations and are examined for the color number "0" (cancel area). In case the color number "0" is encountered in a called-in color location, this color location receives the color number of the appertaining, central sample color location. This operation proceeds in that sequence that, in succession, the first spherical cup is placed around each sample color location, subsequently the second spherical cup is placed, etc., in that the computational circuit 39 calls in the required color coordinates $x_i$, $y_i$ and $z_i$. First, the cup list for the first spherical cup is input via the data bus 52 into the computational circuit 39 and the auxiliary sample list, including the principal sample list, is worked off line-by-line, whereby the color coordinates $x_i$, $y_i$ and $z_i$ of the first spherical shell are successively calculated around each sample. These color coordinates in turn address the color recognition memory 28. At the same time, each addressed memory location is checked as to the potential existence of its already having been occupied with a color number. To that end, the gate circuit 40 is connected via the data line 58 to the data output 31 of the color recognition memory 28. If an occupation exists, the gate circuit 40 is blocked, so that no color number can be inscribed via the data bus 56 into the color recognition memory 28. If, on the other hand, no occupation (color number "0") exists, the gate circuit 40 is opened and the color number of that color sample around which a spherical cup is now being formed is deposited under the currently called-in address. In this manner, successively more spherical cups are placed around the individual sample color locations until the cancel areas are again occupied with color numbers.

3.1.2 A second method form in the re-filling of the cancel areas with color numbers consists therein that, first, the color locations of one of the cancel areas are called in cup-by-cup around the appertaining auxiliary sample color locations and a spacing calculation to all sample color locations is carried out for each called-in color location according to the spacing equation (2). The color location to be occupied then receives the color number of that sample color location for which the smallest spacing was determined.

This operation sequences as follows. In the computational circuit 39, the color coordinates $x_i$, $y_i$ and $z_i$ of one of the color locations to be called in within the cups is calculated and the corresponding address in the color recognition memory 28 is called in via the address bus 55. Moreover, the address control unit 38 polls the sample lists line-by-line via the address bus 43 from the sample memory 36. The color coordinates of the color samples and the color numbers assigned by the operator are transferred into the computational circuit 39 via the data buses 53 and 54. Between the line-wise transfer of the sample lists, the respective spacing between the called-in color location and the corresponding sample color location is determined and compared to the previously determined spacing. This operation is terminated with the calculation of the spacing $d_n$ to the $n^{th}$ color sample and, at the same time, the smallest spacing $d_{min}$ is also determined.

The color number which is assigned to the color sample with the smallest spacing is overwritten from the computational circuit 39 via the data bus 56, the gate circuit 40 and via the data input 30 into the color recognition memory 28 and is deposited there under the marked address. These operations are repeated for all color locations of the cancel area. Subsequently, one moves on to the next auxiliary sample color location, etc., until all cancel areas are finally occupied with color numbers.

3.2. Line-Wise Re-filling of the Cancel Areas

Alternatively to the cup-wise calling-in of the color locations or, respectively, addresses of the color recognition memory 28 within the cancel areas, all memory addresses can also be called in line-wise once by the address control unit 38 via the address bus 55 and be checked for the color numbers "0" with the assistance of the gate circuit 40. When an address with the color number "0" is encountered, then it is a matter of the address of a cancel area and the gate circuit 40 forwards a command "cancel area" via the line 59 to the address control unit 38, whereby the appertaining address is marked and the further calling-up of addresses is interrupted. Now, with the assistance of the spacing calculation, the sample color location lying closest to the marked color location is determined in the computational circuit 39 and its color number is deposited under the marked address via the data bus 56 and the gate circuit 40. The next address with the color number "0" is then determined and the specified spacing calculation is also executed for this address until, finally, all cancel areas are occupied with color numbers.

For a rough, subsequent correction of the color recognition spaces, the scanning element 8 could also be conducted across that part of the color master 1 which is to be corrected in line motions which lie close to one another in order to cover as many color coordinate triads of this part as possible. In this manner of operating, the changeover switch 33 is in its switch position illustrated with broken lines, and the color coordinates directly select the corresponding addresses of the color recognition memory 28. Simultaneously with the motion of scanning element 8, the operator inputs the new color number with the assistance of the ten-key keyboard of the input stage 35, said new color number then being deposited in the color recognition memory 28 under all addresses called in.

In a preferred further development, the individual chrominance planes of the chrominance/luminance color space which are occupied with color numbers are displayed on the color monitor of a correction device as a function of the brightness values (color coordinates z) or, respectively, the individual memory levels of the color recognition memory 28 are displayed. Each color location or, respectively, each memory address corresponds to an image point. Freely selectable colors can be allocated to the color numbers so that each color recognition space (color locations of the same color number) are identified by a specific color. In this manner, respective cutting planes through the individual color recognition spaces can be displayed on the color monitor as differently colored surfaces proceeding perpendicularly to the Z-axis. A partial correction of the color recognition spaces can now ensue in each cutting plane with the assistance of a coordinate detection device, for example, by means of a cursor and a corresponding interchange of color numbers in the color recognition memory.

Figure 3:
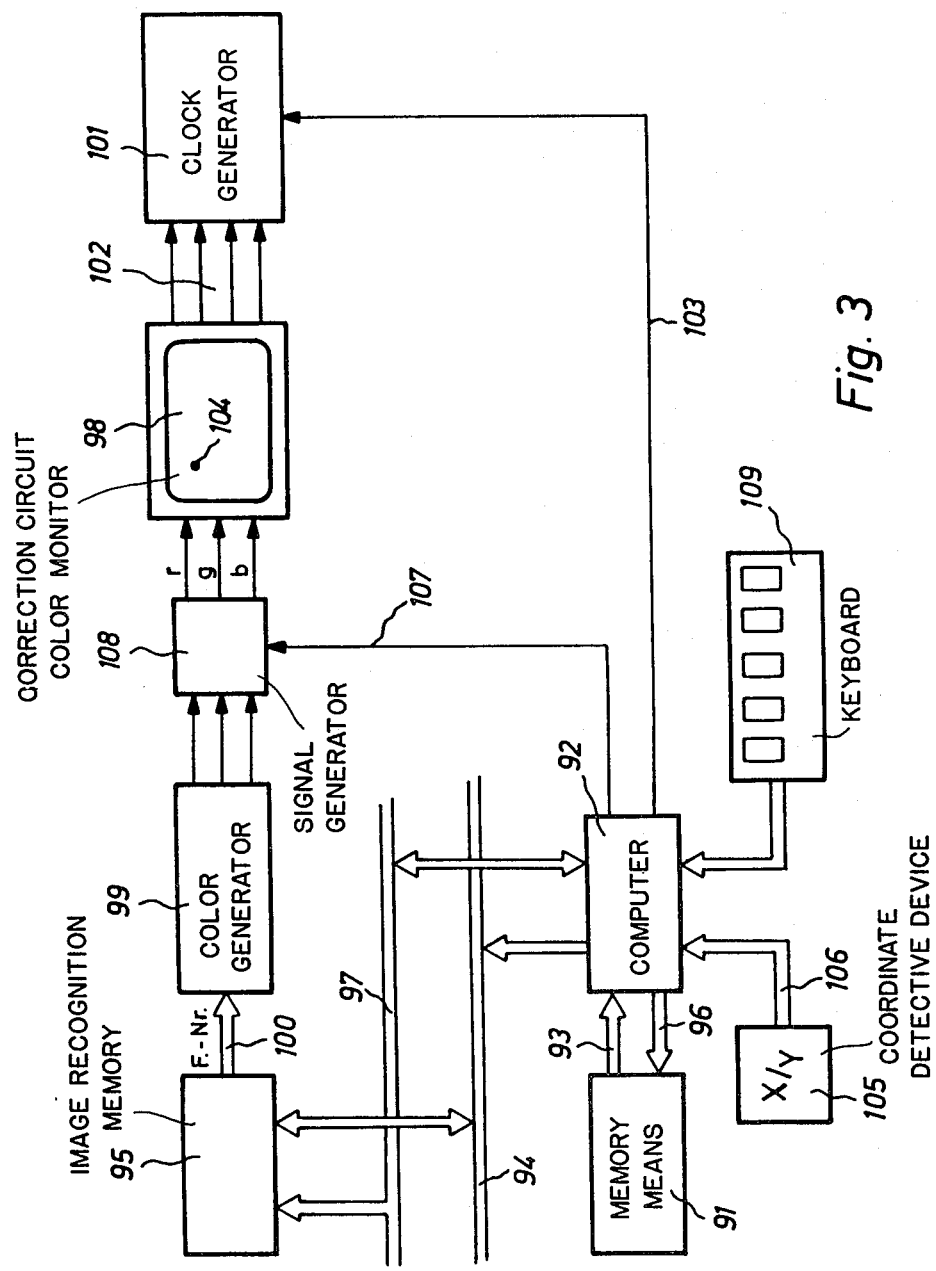
FIG. 3 a correction device.

FIG. 3 shows a sample embodiment for such a correction circuit.

The color numbers required for the display are selected from the data set of a memory means 91 and, with the assistance of a computer 92, are loaded from there via data buses 93 and 94 into an image repetition memory 95. The synchronous addressing of the memory medium 91 and of the image repetition memory 95 are controlled by the computer 92 via the address buses 96 and 97.

The memory medium 91 can be the color recognition memory 28 or a magnetic disk (floppy disk), etc., on which the content of the color recognition memory was previously overwritten.

In order to display the chrominance planes as a cut-image on the picture screen of a color monitor 98, the computer 92 cyclically calls in the addresses of the image repetition memory 95 via the address bus 97 and the digital color numbers deposited there are read out line-by-line and, within each line, image point by image point.

A freely selectable color or, respectively, its color signals r, g and b can be allocated in a color generator 99 to each color number. The color numbers read out of the image repetition memory 95 arrive via a data bus 100 at the color generator 99 which through-connects the previously assigned color signals r, g and b to the color monitor 98.

The recording ensues in accord with line-jump scanning in order to obtain a flicker-free picture. In accord with the technique standard in television, a clock generator 101 generates the horizontal and vertical deflection signals required for the picture recording and the line start and image start pulses on a multiple line 102.

The computer 92 supplies synchronous pulses to the clock generator 101 via a line 103 so that the read-out operation and the image recording proceed synchronously.

In order to mark an image point or, respectively, an address in the image repetition memory 95, a light mark 104 is faded into the picture screen of the color monitor 98 and can be shifted across the surface of the picture screen by means of specifying X/Y coordinates at a coordinate detection device 105.

The prescribed coordinates X/Y are input into the computer 92 via a data bus 106 and there compared to the cyclically called-in addresses of the image repetition memory 95. Given equality, the computer 92 forwards a command "light mark" via a line 107 to a signal generator 108 in the signal path of the color signals r, g and b. The command appears exactly at that point in time in which the electron beams sweep the location of the picture screen marked by the prescribed coordinates. At this point in time, the light mark appears by means of brief, simultaneous switching-on of all color signals with the same radiant intensity per unit area.

At the same time, the light mark 104 also marks that memory location in the image repetition memory 95 to which direct access exists.

The partial correction of the displayed cut images now ensues in such a manner that the operator marks the areas to be corrected with the coordinate detection device 105 and inputs the desired color number into the computer 92 via a data bus 110 by means of a keyboard in an operating unit 109.

During the vertical blanking gap of the image recording, the computer 92, via the address bus 97, addresses the addresses of the image repetition memory 95 marked by the coordinate detection device 105 or, respectively, by the light mark 104, and the changed color numbers are deposited via the data bus 94 under the called-in addresses. The corrected color picture already appears on the picture screen of the color monitor during the next image repetition period.

Commercial Exploitation

The invention is advantageously employed everywhere where colors must be recognized. This is particularly applicable to electronic reproduction technology in which color separations for textile, decorative or packaging printing are produced by means of color recognition circuits or color corrections are carried out for multicolor printing.

Although the invention has been described with respect to preferred embodiments, it is not to be so limited as changes and modifications can be made which are within the full intended scope of the invention as defined by the appended claims.

We claim:

1. The method for partial correction of color recognition spaces in color recognition, in which identification symbols in the colors to be recognized are assigned to the color locations or, respectively, color component triads of trichromatically measured sample points and in which, for the formation of color recognition spaces around the sample color locations, identification symbols for the corresponding color locations are determined from the identification symbols of the sample color locations and in which color locations with the same identification symbol respectively form one color recognition space, comprising the steps of marking at least one additional sample color location or its color component triad at a color recognition space in the spatial region of the subsequent boundary correction which if necessary has a different identification symbol allocated to it, cancelling the previous allocation of identification symbols for the color locations lying around the auxiliary sample color location within a spatial cancel area, and filling each color location of the cancel area with a new identification symbol determined from the identification symbols of the sample color locations.

2. The method according to claim 1, characterized in that the additional sample color location is marked by means of trichromatic measurement of a further sample point.

3. The method according to claim 1 wherein the cancel area is formed of cups around the auxiliary sample color location, and the color locations lying within the cups are considered cup-by-cup with increasing distance from the auxiliary sample color location to the boundaries of the cancel area and cancelling the allocated identification symbols.

4. The method according to claim 3, wherein the cups are designed as spherical cups and the cancel areas have a spherical shape.

5. The method according to claim 4, wherein the formation of the cancel area is discontinued when it becomes tangential to an adjacent cancel area.

6. The method according to claim 4 wherein the boundaries of the spherical cancel area are determined by its radius.

7. The method according to claim 3, wherein the boundaries of the cancel area are defined.

8. The method according to claim 3, wherein the boundaries of the cancel area are calculated.

9. The method according to claims 8, wherein the radius of the cancel area is determined from the spatial distance of the auxiliary sample color location to a color location whose identification symbol recognition space is not to be changed in the subsequent boundary correction.

10. The method according to claim 9, wherein the color location is marked by means of trichromatic measuring of the color components in the colors to be recognized.

11. The method according to claim 8 wherein the radius of the cancel area is determined from the spatial distance of the auxiliary sample color location to the nearest sample color location with an identification symbol which differs from that of the auxiliary sample color location.

12. The method according to claim 3 wherein the cup coordinates ($x_{sm}$, $y_{sm}$, $z_{sm}$) of all color locations participating in the formation of the $m^{th}$ spherical cup are obtained from the plurality of whole numbers which satisfy the spherical equation $$n = r^2 = x^2_{sm} + y^2_{sm} + z^2_{sm}.$$

13. The method according to claim 12, wherein the cup coordinates ($x_{sm}$, $y_{sm}$, $z_{sm}$) of all color locations participating in the formation of the $m^{th}$ spherical cup are determined by means of permutation and operational sign reversal from at least one ordered coordinate triad satisfying the spherical equation with the radius m.

14. The method according to claim 12, wherein the color coordinates ($x_i$, $y_i$, $z_i$) of the color locations to be called in are calculated around a sample color location as a cup center from the cup coordinates ($x_{sm}$, $y_{sm}$, $z_{sm}$) and the color coordinates ($x_{pn}$, $y_{pn}$, $z_{pn}$) of the appertaining sample color location according to the equations:

$$x_i = x_{pn} + x_{sm}$$

$$y_i = y_{pn} + y_{sm}$$

$$z_i = z_{pn} + z_{sm}.$$

15. The method according to claim 3 wherein for the purpose of re-filling the cancel area, the identification symbol of that sample color location which lies in the closest spatial proximity is allocated to each color location of the cancel area.

16. The method according to claim 15 wherein re-filling the cancel area, equi-spaced cups are respectively placed around the individual sample color locations and the color locations within these cups are checked to see if they have identification symbols, and allocating the identification symbols of the central sample color locations to the non-occupied color locations.

17. The method according to claim 15, wherein for the purpose of re-filling the cancel area, the color locations are called in cup-by-cup with increasing spacing from the additional sample color location, determining the spatial distances of a called-in color location to all sample color locations and comparing them to one another, and assigning to them the called-in color locations which have the identification symbol of the sample color location lying in the greatest spatial proximity.

18. The method according to claim 15 wherein the color locations are called up for the purpose of re-filling of the cancel area and checking them to see if they have identification symbols, and if they do not, the spatial distances of a called-in color location to all sample color locations are respectively determined and compared to one another, and allocating the identification symbol of the sample color location which lies at the greatest spatial proximity to the non-occupied color locations.

19. The method according to claim 1 wherein the spatial distance (d) between a first color location with the color coordinates ($x_1$, $y_1$, $z_1$) and a second color location with the color coordinates ($x_2$, $y_2$, $z_2$) are calculated according to the vectorial equation:

$$d = \sqrt{(x_2 - x_1)^2 + (y_2 - y_1)^2 + (z_2 - z_1)^2}\ .$$

20. The method according to claim 1, wherein the color coordinates correspond to the trichromatic measured color value signals (R, G, B).

21. The method according to claim 1, wherein the identification symbols are displayed.

22. The method according to claim 1 wherein for forming the cancel area, color locations are obtained and checked as to their applicability to the cancel area, and cancelling allocated identification symbols in case the selected color locations lie within the boundaries of the cancel area.

23. The method according to claim 22, wherein the spatial distance between the auxiliary sample color location and a called-in color location is determined, and the position of the called-in color location relative to the cancel area is determined by comparing the spacing to the radius of the cancel area.

24. The method according to claim 1 wherein the color coordinates correspond to the cylindrical color coordinates (S, T, L), and the cylindrical color coordinates (S, T, L) are obtained by means of a coordinate transformation of the chrominance/luminance color space into the saturation/tint/brightness color space.

25. The method according to claim 1 comprising displaying on a monitor the cut images (chrominance planes) through the color space or, respectively, through the color recognition spaces are displayed on a monitor.

26. The method according to claim 25 comprising pading an image repetition memory, the identification symbols stored in the first memory, and cyclically reading out the identification symbols of a memory level (z-level) and allocating a triad of color signals to each identification symbol, and driving a color monitor with the color signals.

27. The method according to claim 25 comprising recorrecting the cut images of the color recognition spaces displayed on the color monitor by means of appropriate substitution of identification symbols with the assistance of a cursor.

28. The method according to claim 1 wherein the memory locations of a first color memory are allocated to the color locations, said memory locations being addressable by the digitized color coordinates of the color locations, and depositing the identification symbols of the color locations at the allocated memory locations.

29. The method according to claim 28, wherein the color coordinates are digitized with different resolution.

30. The method according to claim 28, wherein the addresses of the first memory are continuously called in and are checked as to their applicability to the address area which corresponds to the cancel area.

31. The method according to claim 28 comprising storing in a second memory under continuous addresses, a sample list formed from the color coordinate triads of the sample points and the allocated identification symbols and an auxiliary sample list formed from the color coordinate triads of the additionally measured sample points and the allocated identification symbols storing in a third memory the cup coordinates for the individual cups as a cup list in a third memory and the addresses of the second and third memories are called in and are determined from the sample lists and/or from the auxiliary sample lists and the cup lists, the color coordinates or, respectively, the addresses of the first memory.

32. The method according to claim 1 wherein the color coordinates correspond to the chrominance signals (x, y) and to the brightness signal (z), and in that the chrominance signals (x, y) and the brightness signal (z) are obtained by means of coordinate transformation of the RGB color space into the chrominance/luminance color space.

33. A circuit arrangement for partial correction of color recognition spaces, comprising:
 (a) a light source of known spectral composition for illuminating a colored surface the colors of which are to be recognized;
 (b) three opto-electronical-transducers for measuring the color coordinates of sample points in the colored surface, said color coordinates defining sample color locations within the color space;
 (c) analog-to-digital converters (19, 20, 21) connected to said opto-electronical transducers for generating digital color coordinates;
 (d) a color recognition memory (28) for storing identification symbols for the colors to be recognized connected to said analog-to-digital converters (19, 20, 21), said color recognition memory (28) having a plurality of storage locations which correspond to the color locations of the color space, each storage location being addressable by the digital color coordinates of the corresponding color location, and containing the identification symbol associated with said color location, whereby all color locations associated with the same identification symbol forming a color recognition space for a color to be recognized;
 (e) an input stage (35) for assigning identification symbols to color locations;
 (f) a sample memory (36) connected to said input stage (35) and said analog-to-digital converters (19, 20, 21) for storing a sample list from color coordinates of said sample color locations and of at least one additional sample color location marked at a color recognition space in the spatial region of the subsequent boundary correction and from the identification symbols allocated thereto by means of said input stage (35);
 (g) a shell memory (37) for storing shell coordinates in the form of a shell list;
 (h) an address control unit (38) connected to the sample memory (36), the shell memory (37) and to the color recognition memory (28) for addressing and controlling said memories;
 (i) a computer circuit (39) connected to the sample memory (36), the shell memory (37), the color recognition memory (28) and to said address control unit (38), said computer circuit (39) calculating addresses of the color recognition memory (28) from the color coordinates of said additional sample color locations and said shell coordinates and calling up said calculated addresses for cancelling the previous allocation of identification symbols for the color locations lying around said additional sample color location within a spatial cancel area during a cancel phase, and said computer circuit (39) calling up addresses of said color recognition memory (28) for filling each color location of the cancel area with a new identification symbol determined by said computer circuit (39) from the identification symbols assigned to the sample color locations and to the additional sample color location during the filling phase; and (j) a circuit stage (40) connected to said color recognition memory (28) and to said computer circuit (39), said circuit stage (40) checking the addressed storage locations of said color recognition memory (28) during the filling phase whether the addressed storage locations belong to the cancel area or not.

34. A circuit arrangement according to claim 33, including a display unit (75) connected to the output of said color recognition memory (28) for controlling the partial boundary corrections of color recognition spaces by displaying identification symbols read from said color recognition memory (28).

35. An arrangement according to claim 33, including:
   (a) an image repetition memory (95) connected to said color recognition memory (28) for acceptance identification symbols of selectable storage areas of said color recognition memory (28);
   (b) a color monitor (98) driven by color signals for displaying sectional views from color recognition spaces the boundaries of which are to be corrected;
   (c) a color generator (99) connected to said image repetition memory (95) and to said color monitor (98), said color generator (99) generating said color signals by assigning a freely selectable triplet of color values to each identification symbol read from said image repetition memory (95), whereby the sectional views of the color recognition spaces are displayed in different colors determined by said triplets of color values; and
   (d) a control unit (98, 109) consisting of a coordinate measuring device (105) connected to the image repetition memory (95) for addressing selectable storage locations within the image repetition memory (95) by means of said coordinate measuring device (105), for cancelling identification symbols and for substitution new identification symbols so as to correct the boundaries of the color recognition spaces.

* * * * *